United States Patent [19]
Barkley et al.

[11] Patent Number: 5,037,551
[45] Date of Patent: Aug. 6, 1991

[54] HIGH-FLOW RATE CAPACITY AEROBIC BIOLOGICAL DEHALOGENATION REACTOR

[75] Inventors: William A. Barkley, Maple Valley, Wash.; Curtis W. Bryant, Tucson, Ariz.

[73] Assignee: Weyerhaeuser Company, Tacoma, Wash.

[21] Appl. No.: 287,107

[22] Filed: Dec. 19, 1988

[51] Int. Cl.$^5$ ............................................... C02F 3/34
[52] U.S. Cl. ..................................... 210/603; 210/610; 210/612; 210/747; 210/908; 210/928; 435/250; 435/267
[58] Field of Search ........ 210/603, 610, 611, 614–617, 210/620, 630, 631, 747, 908, 909, 928; 435/247–250, 267, 281, 858

[56] References Cited

U.S. PATENT DOCUMENTS

| | | | |
|---|---|---|---|
| 3,979,283 | 9/1976 | Prudom | 210/11 |
| 4,266,034 | 5/1981 | Patel et al. | 435/253 |
| 4,323,649 | 4/1982 | Higgins | 435/136 |
| 4,344,848 | 8/1982 | Hakulinen | 210/611 X |
| 4,348,476 | 9/1982 | Hou | 435/123 |
| 4,385,121 | 5/1983 | Knowlton | 435/244 |
| 4,401,569 | 8/1983 | Jhaveri et al. | 210/610 |
| 4,447,541 | 5/1984 | Peterson | 435/264 |
| 4,452,894 | 6/1984 | Olsen et al. | 435/253 |
| 4,455,373 | 6/1984 | Higgins | 435/132/ |
| 4,473,643 | 9/1984 | Higgins | 435/157 |
| 4,493,895 | 1/1985 | Colaruotolo et al. | 210/610 X |
| 4,623,464 | 11/1986 | Ying et al. | 210/616 |
| 4,664,805 | 5/1987 | Focht | 210/611 |
| 4,713,340 | 12/1987 | Crawford | 435/253 |
| 4,713,343 | 12/1987 | Wilson, Jr. et al. | 435/264 |
| 4,749,491 | 6/1988 | Lawes et al. | 210/610 |
| 4,765,901 | 8/1988 | Field | 210/603 |

FOREIGN PATENT DOCUMENTS

| | | |
|---|---|---|
| 1148488 | 6/1983 | Canada . |
| 3208977A1 | 9/1983 | Fed. Rep. of Germany . |
| 239197A1 | 9/1986 | Fed. Rep. of Germany . |
| 3715952 | 11/1988 | Fed. Rep. of Germany . |

OTHER PUBLICATIONS

Bailey and Ollis, *Biochemical Engineering Fundamentals* (2nd. ed.), McGraw-Hill, N.Y. (1986), pp. 595–600, 626–630.

(List continued on next page.)

Primary Examiner—Tom Wyse
Attorney, Agent, or Firm—Klarquist, Sparkman, Campbell, Leigh & Whinson

[57] ABSTRACT

A method and apparatus are disclosed for dehalogenating and further biodegrading organic compounds, including halogenated organic compounds, present in an aqueous mixture, the mixture comprising the waste effluent produced in a continuous high flow rate by an industrial plant such as a bleach pulp or paper mill using chlorine and chlorine compounds. The aqueous mixture is passed through at least one combination of a first oxygen-enriched liquid zone and a second zone containing a mixed population of methylotrophic and heterotrophic microorganisms supported on a substrate bed. A first gas including oxygen is flowed through the first zone and second gas consisting substantially of a low-molecular-weight alkane is flowed through the second zone as the aqueous mixture passes through the first and second zones. The microorganisms supported by the bed dehalogenated and further biodegrade the organic compounds in the aqueous liquid flowing through the bed as they aerobically metabolize the low-molecular-weight alkane. The first zone may be hydraulically coupled to an upstream aerobic biopond for decreasing the total organic carbon and biochemical oxygen demand of the aqueous mixture before the mixture is passed through the first and second zones. A plurality of paired first and second zones may be hydraulically interconnected to achieve a higher degree of dehalogenation and further biodegradation of organic compounds in the aqueous mixture flowing therethrough and/or to accommodate higher flow rates.

26 Claims, 2 Drawing Sheets

OTHER PUBLICATIONS

Tsien, H-C et al., "Biodegradation of Trichloroethylene by *Methylosinus trichosporium* OB3b," *Appl. Environ. Microbiol.* 55:3155–3161 (1989).

Oldenhuis, R. et al., "Degradation of Chlorinated Aliphatic Hydrocarbons by *Methylosinus trichosporium* OB3b Expressing Soluble Methane Monooxygenase," *Appl. Environ. Microbiol.* 55:2819–2826 (1989).

Strandberg, G. W. et al., "Degradation of Trichloroethylene and trans-1,2-Dichloroethylene by a Methanotrophic Consortium in a Fixed-Film, Packed-Bed Bioreactor," *Environ. Sci. Technol.* 23:1422–1425 (1989).

Uchiyama, H. et al., "Aerobic Degradation of Trichloroethylene at High Concentration by a Methane-Utilizing Mixed Culture," *Agric. Biol. Chem.* 53:1019–1024 (1989a).

Henson, H. et al., "Metabolism of Chlorinated Methanes, Ethanes, and Ethylenes by a Mixed Bacterial Culture Growing on Methane," *J. Ind. Microbiol.* 4:29–35 (1989).

Uchiyama, H. et al., "Aerobic Degradation of Trichloroethylene by a New Type II Methane-Utilizing Bacterium, Strain M," *Agric. Biol. Chem.* 53:2903–2907 (1989b).

Hanson, R. S. et al., "Development of Methanotrophs for the Biodegradation of Trichloroethylene and Other Chlorinated Olefins," *Abstr. Pap. Am. Chem. Soc.*, 1989 Meeting (1989).

Mayer, K. P. et al., "Degradation of Trichloroethylene by Methanotrophic Bacteria in a Laboratory Column of Saturated Aquifer Material," *Water Sci. Tech.* 20:175–178 (1988).

Thomas, J. M. and Ward, C. H., "In situ Biorestoration of Organic Contaminants in the Subsurface," *Environ. Sci. Technol.* 23:760–766 (1989).

Dooley-Danna, M. et al., "The Sequential Anaerobic-/Aerobic Biodegradation of Chlorinated Ethenes in an Aquifier Simulator," *Abstr. Annu. Meet. Am. Soc. Microbiol.*, 1989 Meeting (1989).

Eng, W. and Palumbo, A. V., "Trichloroethylene and Trans-1,2-Dichloroethylene Degradation by Pure Methanotrophic Cultures and Mixed Methane-Utilizing Consortia," *Abstr. Annu. Meet. Am. Soc. Microbiol.*, 1989 Meeting (1989).

Henry, S. M. et al., "Effects of Mineral Medium on Trichloroethylene Oxidation and Involvement of a Particulate Methane Monooxygenase," *Abstr. Annu. Meet. Am. Soc. Microbiol.*, 1989 Meeting (1989).

Moore, A. T. et al., "Biodegradation of Trans-1,2-Dichloroethylene by Methane-Utilizing Bacteria in an Aquifer Simulator," *Environ. Sci. Technol.* 23:403–406 (1989).

Janssen, D. B. et al., "Degradation of Trans-1,2-Dichloroethene by Mixed and Pure Cultures of Methanotrophic Bacteria," *Appl. Microbiol. Biotechnol.* 29:392–399 (1988).

Nelson, M. J. K. et al., "Preliminary Development of a Bench-Scale Treatment System for Aerobic Degradation of Trichloroethylene," *Basic Life Sci.* 45:203–209 (1988).

Meyer, P. and Bartha, R., "Effects of Analog Substrates, Methanogens and Methanotrophs on the Persistence of 2,3,7,8-Tetrachlorodibenzo-p-Dioxin (TCDD)," *Abstr. Annu. Meet. Am. Soc. Microbiol.*, 1988 Meeting (1988).

Roberts, P. V. et al., *In-Situ Aquifer Restoration of Chlorinated Aliphatics by Methanotrophic Bacteria*, Report No. EPA/600/2-89/033 (1989).

Donaldson, T. L. et al., *Biotreatment of TCE (Trichloroethylene) Contaminated Groundwater*, Report No. CONF-890430-3 (1989).

Semprini, L. et al., "In Situ Biodegradation for Aquifer Restoration," *Environ. Waste Mgt. Mag.*. (Apr. 1990); pp. 22–23.

Leisinger, T., "Microbial Degradation of Chlorinated Alkanes and Alkenes," *Eur. Conf. Biotechnol.* (1988); pp. 150–154.

Strandberg, G. W. et al., *Degradation of Trichloroethylene and Trans-1,2-Dichloroethylene by a Methanotrophic Consortia in a Trickle-Type Bioreactor*, Report No. CONF.-881054-23 (1988).

Barrio-Lage et al., "Sequential Dehalogenation of Chlorinated Ethenes," *Environ. Sci. Technol.* 20:96–99 (1986).

Barrio-Lage et al., "Kinetics of the Depletion of Trichloroethene," *Environ. Sci. Technol.* 21:366–370 (1987).

Kloepfer et al., "Anaerobic Degradation of Trichloroethylene in Soil," *Environ. Sci. Technol.* 19:277–280 (1985).

(List continued on next page.)

OTHER PUBLICATIONS

Khare and Dondero, "Fractionation and Concentration from Water of Volatiles and Organics on High Vacuum System: Examination of Sanitary Landfill Leachate," *Environ. Sci. Technol.* 11:814–819 (1977).

Parsons et al., "Transformations of Tetrachloroethene and Trichloroethene in Microcosms and Groundwater," *Jour. A.W.A.A.*, Feb., 1984:56–59.

Parsons and Lage, "Chlorinated Organics in Simulated Groundwater Environments," *Jour. A.W.W.A.*, May, 1985:52–59.

Petura, "Trichloroethylene and Methyl Chloroform in Groundwater: A Problem Assessment," *Jour. A.W.W.A.*, Apr., 1981:200–205.

Tabak et al., "Biodegradability Studies With Organic Priority Pollutant Compounds," *Jour. W.P.C.F.* 53:1503–1518 (1981).

Wilson et al., "Biotransformations of Selected Alkylbenzenes and Halogenated Aliphatic Hydrocarbons in Methanogenic Aquifer Material: A Microcosm Study," *Environ. Sci. Technol.* 20:997–1002 (1986).

Trussell et al., "Precise Analysis of Trihalomethanes," *Jour. A.W.W.A.*, Jul., 1979:385–396.

Brunner et al., "Bacterial Degradation of Dichloromethane," *Appl. Environ. Microbiol.* 40:950–958 (1980).

Brown et al., "Pentachlorophenol Degradation: A Pure Bacterial Culture and an Epilithic Microbial Consortium," *Appl. Environ. Microbiol.* 52:92–97 (1986).

Boyd et al., "Anaerobic Biodegradation of Phenolic Compounds in Digested Sludge," *Appl. Environ. Microbiol.* 46:50–54 (1983).

Deeley et al., "Biodegradation of [14C]Phenol in Secondary Sewage and Landfill Leachate Measured by Double-Vial Radiorespirometry," *Appl. Environ. Microbiol.* 49:867–869 (1985).

Petrasek et al., "Fate of Toxic Organic Compounds in Wastewater Treatment Plants," *Jour. W.P.C.F. 55:1286–1296 (1983).*

Young and Rivera, "Methanogenic Degradation of Four Phenolic Compounds," *Water Res.* 19:1325–1332 (1985).

Grbic-Galic and Vogel, "Transformation of Toluene and Benzene by Mixed Methanogenic Cultures," *Appl. Environ. Microbiol.* 53:254–260 (1987).

Healy and Young, "Anaerobic Biodegradation of Eleven Aromatic Compounds to Methane," *Appl. Environ. Microbiol.* 38:84–89 (1979).

Boethling and Alexander, "Effect of Concentration of Organic Chemicals on Their Biodegradation by Natural Microbial Communities", *Appl. Environ. Microbiol.* 37:1211–1216 (1979).

Suflita et al., "Kinetics of Microbial Dehalogenation of Haloaromatic Substrates in Methanogenic Environments", *Appl. Environ. Microbiol.* 45:1466–1473 (1983).

Brown, "Household Hazardous Waste: The Unresolved Water Quality Dilemma," *Jour. W.P.C.F.* 59:120–124 (1987).

DeWalle and Chian, "Detection of Trace Organics in Well Water Near a Solid Waste Landfill," *Jour. A.W.W.A.*, Apr., 1981: 206–211.

Vogel and Grbic-Galic, "Incorporation of Oxygen From Water Into Toluene and Benzene During Anaerobic Fermentative Transformation," *Appl. Environ. Microbiol.* 52:200–202 (1986).

Geraghty and Miller, "Status of Groundwater Contamination in the U.S.," *Jour. A.W.W.A.*, Mar., 1978:162–167.

Harmsen, "Identification of Organic Compounds in Leachate From A Waste Tip," *Water Res. 17:699–705 (1983).*

Keith and Telliard, "Priority Pollutants I-A Perspective View," *Environ. Sci. Technol.* 13:416–423 (1979).

Kim and Maier, "Acclimation and Biodegradation of Chlorinated Organic Compounds in the Presence of Alternate Substrates," *Jour. W.P.C.F.* 58:157–164 (1986).

Kobayashi and Rittman, "Microbial Removal of Hazardous Organic Compounds," *Environ. Sci. Technol.* 16:170A–183A (1982).

Morgan, "Floating Chains and Fine Bubbles Improve Lagoon Aeration Methods," *Pulp & Paper*, Apr., 1987:87–88.

Tittlebaum, "Organic Carbon Content Stabilization Through Landfill Leachate Recirculation," *Jour. W.P.C.F.* 54:428–433 (1982).

Bouwer and McCarty, "Transformations of 1- and 2-Carbon Halogenated Aliphatic Organic Compounds Under Methanogenic Conditions," *Appl. Environ. Microbiol.* 45:1286–1294 (1983).

(List continued on next page.)

OTHER PUBLICATIONS

Alexander, "Biodegradation of Organic Chemicals," *Environ. Sci. Technol.* 18:106–111 (1985).

Patterson and Kodukala, "Biodegradation of Hazardous Organic Pollutants," *CEP*, Apr., 1981, pp. 48–55.

McDougall et al., "Contaminant and Treatment of the Love Canal Landfill Leachate," *Jour. W.P.C.F.* 52: 2914–2924 (1980).

Schmidt et al., "Degradation of Chlorophenols by a Defined Mixed Microbial Community," *App. Environ. Microbiol.* 46:1038–1044 (1983).

Marinucci and Bartha, "Biodegradation of 1,2,3- and 1,2,4-Trichlorobenzene in Soil and in Liquid Enrichment Culture," *App. Environ. Microbiol.* 38:811–817 (1979).

Healy and Young, "Catechol and Phenol Degradation by a Methanogenic Population of Bacteria," *App. Environ. Microbiol.* 35:216–218 (1978).

Klecka and Maier, "Kinetics of Microbial Growth on Pentachlorophenol," *App. Environ. Microbiol.* 49:46–53 (1985).

Gibson and Suflita, "Extrapolation of Biodegradation Results to Groundwater Aquifers: Reductive Dehalogenation of Aromatic Compounds," *App. Environ. Microbiol.* 52:681–688 (1986).

Zeyer et al., "Rapid Microbial Mineralization of Toluene and 1,3-Dimethylbenzene in the Absence of Molecular Oxygen," *App. Environ. Microbiol.* 52:944–947 (1986).

Mikesell and Boyd, "Complete Reductive Dechlorination and Mineralization of Pentachlorophenol by Anaerobic Microorganisms," *App. Environ. Microbiol.* 52:861–865 (1986).

Dalton, H., and Stirling, D. I., "Co-Metabolism," *Phil. Trans. R. Soc. Lond.* B 297:481–496 (1982).

Wilson, J. T., and Wilson, B. H., "Biotransformation of Trichloroethylene in Soil," *Applied and Environ. Microbiol.* 49:242–243 (Jan. 1985).

Fogel, M. M., Taddeo, A. R., and Fogel, S., "Biodegradation of Chlorinated Ethenes by a Methane-Utilizing Mixed Culture," *Applied and Environ. Microbiol.* 51:720–724 (Apr. 1986).

Higgins, I. J., Best, D. J., and Hammond, R. C.; "New Findings in Methan-Utilizing Bacteria Highlight Their Importance in the Biosphere and Their Commercial Potential," *Nature* 286:561–564 (Aug. 1980).

Strand, S. E. and Shippert, L.; "Oxidation of Chloroform in an Aerobic Soil Exposed to Natural Gas," *Applied and Environ. Microbiol.* 52:203–205 (Jul. 1986).

Haber, C. L. et al., "Methylotrophic Bacteria: Biochemical Diversity and Genetics," *Science* 221:1147–1153 (Sep. 1983).

Best, D. J. and Higgins, I. J.; "Methane-Oxidizing Activity and Membrane Morphology in a Methanol–Grown Obligate Methanotroph, *Methylosinus trichosporium* OB3b," *J. Gen. Microbiol.* 125:73–84 (1981).

Scott, D., Brannan, J. and Higgins, I. J.; "The Effect of Growth Conditions on Intracytoplasmic Membranes and Methane Mono-oxygenase Activities in *Methylosinus trichosporium* OB3b," *J. Gen. Microbiol.* 125:63–72 (1981).

Dostalek, M. and Molin, N., "Studies of Biomass Production of Methanol Oxidizing Bacteria," in *Single-Cell Protein II* (Tannenbaum, S. R. and Wang, D.C., eds.); MIT Press, pp. 385–401.

Coty, V. F., "A Critical Review of the Utilization of Methane," *Biotech and Bioeng. Symposium No. 1* (Second International Conference on Global Impacts of Applied Microbiology, Addis Ababa, Ethiopia, 1967), Interscience, 1969, pp. 105–117.

Little, C. D. et al., "Trichloroethylene Biodegradation by a Methane-Oxidizing Bacterium," *Applied and Environ. Microbiol.* 54:951–956 (Apr. 1988).

Hanson, R. S., "Encology and Diversity of Methylotrophic Organisms," *Advances in Applied Microbiology*, vol. 26:3–39 (1980) Academic Press.

Colby, J., Dalton, H. and Whittenbury, R., "Biological and Biochemical Aspects of Microbial Growth on $C_1$ Compounds," *Ann. Rev. Microbiol.* 33:481–517 (1979).

Higgins, I. J., et al., "Methane-Oxidizing Microorganisms," *Microbiol. Reviews*, 45:556–590, (Dec. 1981).

Nichols, P. D., et al., "Detection of a Microbial Consortium, Including Type II Methanotrophs, by Use of Phospholipid Fatty Acids in an Aerobic Halogenated Hydrocarbon-Degrading Soil Column Enriched with Natural Gas," *Environ. Toxicol. and Chem.*, 6:89–97, (1987).

Whittenbury, R. and Dalton, H., "The Methylotrophic Bacteria," in *The Prokaryotes*, vol. I, Ch. 71, pp. 894–902, (1981).

Leadbetter, E. R. and Foster, J. W., "Studies on Some (List continued on next page.)

OTHER PUBLICATIONS

Methane-Utilizing Bacteria," *Archiv fur Mikrobiologie Bd.*, 30:91–118, (1958).

Higgins, I. J. and Quayle, J. R., "Oxygenation of Methane by Methane-Grown *Pseudomonas methanica* and *Methanomonas methanooxidans*," *Biochem. J.*, 118:201–208, (1970).

Hou, C. T., et al., "Microbial Oxidation of Gaseous Hydrocarbons: Epoxidation of $C_2$ to $C_4$ n-Alkenes by Methylotrophic Bacteria," *Applied and Environ. Microbiol.*, 38:127–134, (Jul. 1979).

Vogel, T. M. and McCarty, P. L., "Biotransformation of Tetrachloroethylene to Trichloroethylene, Dichloroethylene, Vinyl Chloride, and Carbon Dioxide under Methanogenic Conditions," *Applied and Environ. Microbiol.*, 49:1080–1083, (May 1985).

Bouwer, E. J. and McCarty, P. L., "Utilization Rates of Trace Halogenated Organic Compounds in Acetate--Grown Biofilms," *Biotech. and Bioeng.*, 27:1564–1571, (1985).

Steiert, J. G., Pignatello, J. J. and Crawford, R. L., "Degradation of Chlorinated Phenols by a Pentachlorophenol-Degrading Bacterium," *Applied and Environ. Microbiol.*, 53:907–910, (May 1987).

Steiert, J. G. and Crawford, R. L., "Catabolism of Pentachlorophenol by a Flavobacterium Sp.," *Biochem. Biophys. Res. Comm.*, 141:825–830, (Dec. 1986).

Saber, D. L. and Crawford, R. L., "Isolation and Characterization of Flavobacterium Strains that Degrade Pentachlorophenol," *Applied and Environ. Microbiol.*, 50:1512–1518, (Dec. 1985).

Crawford, R. L. and Mohn, W. W., "Microbiological Removal of Pentachlorophenol from Soil Using a Flavobacterium," *Enzyme Microb. Technol.*, 7:617–620, (Dec. 1985).

Apajalahti, J. H. A. and Salkinoja-Salonen, M. S., "Dechlorination and para-Hydroxylation of Polychlorinated Phenols by *Rhodococcus chlorophenolicus*," *J. Bacteriol.*, 169:675–681, (Feb. 1987).

Apajalahti, J. H. A. and Salkinoja-Salonen, M. S., "Degradation of Polychlorinated Phenols by *Rhodococcus chlorophenolicus*," *Applied Microbiol. Biotechnol.*, 25:62–67, (1986).

Janssen, D. B., et al., "Degradation of Halogenated Aliphatic Compounds by *Xanthobacter autotrophicus* GJ10," *Applied and Environ. Microbiol.*, 49:673–677, (Mar. 1985).

Nelson, M. J. K., et al., "Aerobic Metabolism of Trichloroethylene by a Bacterial Isolate," *Applied and Environ. Microbiol.*, 52:383–384, (Aug. 1986).

Nelson, M. J. K., et al., "Biodegradation of Trichloroethylene and Involvement of an Aromatic Biodegradative Pathway," *Applied and Environ. Microbiol.*, 53:949–954, (May 1987).

DeBont, J. A. M., et al., "Microbial Degradation of 1,3-Dichlorobenzene," *Applied and Environ. Microbiol.*, 52:677–680, (Oct. 1986).

Schraa, G., et al., "Degradation of 1,4-Dichlorobenzene by Alcaligenes sp. Strain A175," *Applied and Environ. Microbiol.*, 52:1374–1381, (Dec. 1986).

Kilbane, J. J., et al., "Biodegradation of 2,4,5-Trichlorophenoxyacetic Acid by a Pure Culture of *Pseudomonas cepacia*," *Applied and Environ. Microbiol.*, 44:72–78, (Jul. 1982).

Karns, J. S., et al., "Metabolism of Halophenols by 2,4,5-Trichlorophenoxyacetic Acid-Degrading *Pseudomonas cepacia*," *Applied and Environ. Microbiol.*, 46:1176–1181, (Nov. 1983).

Reineke, W. and Knackmuss, H.-J., "Microbial Metabolism of Haloaromatics: Isolation and Properties of a Chlorobenzene-Degrading Bacterium," *Applied and Environ. Microbiol.*, 47:395–402, (Feb. 1984).

Pain, S., "Microbes 'Could Break Down Dioxin'," *New Scientist*, p. 36, (Feb. 25, 1988).

Chu, J. P. and Kirsch, E. J., "Metabolism of Pentachlorophenol by an Axenic Bacterial Culture," *Applied Microbiol.*, 23:1033–1035, (May 1972).

Hou, C. T., et al., "Epoxidation of Short-Chain Alkenes by Resting-Cell Suspensions of Propane-Grown Bacteria," *Applied and Environ. Microbiol.*, 46:171–177, (Jul. 1983).

Colby, J., Dalton, H. and Whittenbury, R., "An Improved Assay for Bacterial Methane Mono-Oxygenase: Some Properties of the Enzyme from *Methylomonas methanica*," *Biochem. J.*, 151:459–462, (1975).

Colby, J. and Dalton, H., "Some Properties of a Soluble Methane Mono-Oxygenase from *Methylococcus capsulatus* Strain Bath," *Biochem. J.*, 157:495–497, (1976).

Tonge, G. M., Harrison, D. E. F. and Higgins, I. J., "Purification and Properties of the Methane Mono-Ox- (List continued on next page.)

OTHER PUBLICATIONS ygenase Enzyme System from *Methylosinus trichosporium OB3b,*" *Biochem. J.,* 161:333–344, (1977).

Patel, R. N. and Savas, J. C., "Purification and Properties of the Hydroxylase Component of Methane Monooxygenase," *J. Bacteriol.,* 169:2313–2317, (May 1987).

Ghosal, D., et al., "Microbial Degradation of Halogenated Compounds," *Science,* 228:135–142, (Apr. 1985).

Abelson, P. H., "Treatment of Hazardous Wastes," *Science,* 233:509, (Aug. 1986).

Abelson, P. H., Extract from a proposed manuscript, (Jan. 1987).

Barrio-Lage, G. A., Parsons, F. Z. and Lorenzo, P. A., "Inhibition and Stimulation of Trichloroethylene Biodegradation in Microaerophilic Microcosms," *Environ. Toxicol. and Chem.,* 7:889–895, (1988).

Rintala, J. and Vuoriranta, P., "Anaerobic-Aerobic Treatment of Thermomechanical Pulping Effuents," *Tappi Journal,* (Sep. 1988).

Wilson, J. T., et al., "Transport and Fate of Selected Organic Pollutants in a Sandy Soil," *J. Environ. Qual.,* 10:501–506, (1981).

Woodward, R. E., "Destroying Toxic Waste by Bioremediation: The Process Works", (unknown origin and date).

Dean-Ross, D., "Biodegradation of Toxic Wastes in Soil," *ASM News,* 53:490–492, (1987).

HIGH-FLOW RATE CAPACITY AEROBIC BIOLOGICAL DEHALOGENATION REACTOR

FIELD OF THE INVENTION

This invention relates to the aerobic biodegradation of various organic compounds present in an aqueous liquid mixture. In particular, the aqueous mixture, typically comprising the liquid waste effluent from a pulp or paper mill, is passed through a bioreactor capable of accommodating a large, continuous volume throughput of the aqueous mixture, the bioreactor containing a mixed microbial population, including methylotrophic microorganisms supported on a solid substrate bed. The population of microorganisms dehalogenates and further biodegrades the organic compounds in the mixture.

BACKGROUND OF THE INVENTION

As world population and industrial development have increased in the face of progressively stricter regulation and enforcement of environmental standards, substantial work has been directed toward effective processes for purifying soil and water polluted by organic chemicals. Some of these processes are aimed at cleaning up soils and water contaminated by prior discharges of waste organic compounds from industry and agriculture. Other processes are aimed at minimizing further release of such compounds into the environment. Many such processes are ineffective because a number of organic compounds, especially various halogenated species, are refractory, being resistant to biological or chemical attack by existing means or unless excessive amounts of energy are expended. Unfortunately, many halogenated organic compounds are toxic; some are known or suspect carcinogens or mutagens. Hence, as these compounds become more widespread in soil and water around the world, the need for efficacious and inexpensive methods for treating such wastes becomes increasingly urgent.

Halogenated organic compounds can be separated from aqueous liquids by conventional technology. However, the process is expensive and still results in a complex mixture of halogenated compounds that must be purified from one another to be of any practical use. Unless the constituent compounds can be repurified for further industrial use, such mixtures of halogenated organic compounds remain a waste material that presents a serious disposal problem. Further, certain industrial processes produce highly toxic wastes in concentrations too low to be repurified by any practical means. One example of such a waste is dioxin, which may be present in part-per-trillion concentrations in effluents from bleach pulp or paper mills, resulting from the action of a chlorine bleaching agent with lignins and other substances associated with wood pulp.

Some existing processes have employed various types of microorganisms to biologically degrade the pollutants. For example, U.S. Pat. No. 4,401,569 to Jhaveri et al. discloses a method and apparatus for treating ground water contaminated with certain halogenated hydrocarbons. In the Jhaveri process, ground water is removed from a site and stored in a holding tank from which the water is delivered to a biostimulation tank. The biostimulation tank contains microorganisms naturally occurring at the contamination site or introduced thereto, which utilize the particular organic pollutants as a source of carbon and energy. Nutrients, including certain inorganic salts and other unspecified compounds, are added to the biostimulation tank to accelerate the organisms' metabolism of the pollutants. The biostimulation tank is also aerated with oxygen and/or other unspecified gas. Over time, biodegradation processes decrease the concentrations of organic pollutants in the water in the biostimulation tank. After a length of time, the treated water is transferred to a settling tank where further nutrients are then added to the treated water and from which the water is returned to the soil at the contamination site. Oxygen and/or other unspecified gases are also injected into the soil at the return site. Thus, the Jhaveri et al. patent is primarily concerned with a batch process for the biological removal of certain hydrocarbons from contaminated soil and ground water. Jhaveri et al. do not disclose or suggest supporting methylotrophic microorganisms on a solid substrate bed through which an aqueous mixture containing organic compounds is continuously passed for biodegrading the compounds. Further, Jhaveri et al. do not disclose the stimulation of microbial metabolic activity by the injection of any gas containing carbon into either the biostimulation tank or into the soil at the return site.

U.S. Pat. No. 4,713,343 of Wilson, Jr. et al. relates to a process for aerobic biodegradation of certain low-molecular-weight halogenated aliphatic hydrocarbons in water using methanotrophic bacteria. The Wilson, Jr. et al. patent is purportedly applicable to the treatment of contaminated drinking water, ground water and industrial wastewater. In the Wilson, Jr. et al. process, methanotrophic bacteria present in soil and water are exposed to oxygen or air and a low concentration of a low-molecular-weight alkane, such as methane or natural gas. Wilson, Jr. et al. mentioned that the process can occur in any material that can be colonized by alkane-oxidizing bacteria. In one approach, natural gas and air are dissolved in water containing a suspension of the bacteria and a specific halogenated aliphatic hydrocarbon. After a time, the bacteria degrade the hydrocarbon in the water. Wilson, Jr. et al. specifically disclose a batch process of removing ground water from a site having contaminated soil, treating the water in the above manner, and returning the water to the ground. They also disclose an in situ approach wherein water containing dissolved air and a low-molecular-weight alkane are injected deep into contaminated soil to stimulate indigenous bacteria to degrade the soil contaminant.

Wilson, Jr. et al. only describe quantitative results obtained with laboratory-scale mock-ups of the in situ approach wherein soil was packed in a glass column to a depth of 150 cm. A stream of air containing 0.6-percent natural gas by volume was passed over the head of the column. Following a three-week acclimation, water containing trichloroethylene was applied to the column at the rate of 21 $cm^3$ per day. Most of the trichloroethylene in the water was biodegraded. Wilson, Jr. et al. is not understood to address high volume wastewater treatment applications.

U.S. Pat. No. 4,385,121 of Knowlton also discloses the use of soil microorganisms to biodegrade hydrocarbon contaminants in the soil. The Knowlton patent describes a land-farming process in which at least one of a spent, solid, particulate porous, hydrocarbon cracking catalyst or a spent, solid, porous particulate filtration medium is tilled or otherwise incorporated into soil contaminated with hydrocarbon wastes. The microorganisms in the soil then biodegrade the waste hydrocarbons. The addition of catalyst or filtration medium improves aeration necessary for supporting microorganism metabolism.

U.S. Pat. No. 4,323,649 of Higgins discloses the use of a specific methanotrophic strain, *Methylosinus trichosporium* strain OB3b, to perform partial degradation of organic compounds in an aqueous mixture. Higgins teaches the use of either whole Methylosinus cells or enzyme extracts therefrom in the absence of any solid supporting medium. Hence, Higgins does not disclose a bioreactor containing immobilized microorganisms on a solid substrate. He also does not disclose a bioreactor capable of treating large volumes of waste effluent from an industrial plant, especially an effluent containing a complex mixture of organic compounds. Higgins also does not disclose the employment of a multiplicity of microorganism strains to perform the biodegradation.

Hence, although prior art approaches are known, a need exists for an improved method and apparatus for biodegrading complex aqueous mixtures of various organic compounds, especially for dehalogenating and further biodegrading recalcitrant halogenated organic wastes, including chlorinated organic compounds, as they are generated in high volume by industrial plants.

SUMMARY OF THE INVENTION

In accordance with the present invention, a biological reactor for dehalogenating and biodegrading waste organic compounds present in a water mixture is comprised of at least one combination of a first and second zone, the second zone including a substrate bed supporting a heterogeneous microbial population including methylotrophic microorganisms, and the first zone being oxygen-enriched but containing substantially no immobilized microorganisms. The substrate bed in each second zone is comprised of any suitable material, such as rigid spherical bodies having a plurality of internal cavities and passages therethrough, which offers a large surface area for colonization by microorganisms and which allows high liquid flow rates through the bed with minimal pressure drop. A low-molecular-weight alkane gas, such as methane, is flowed through the bed to provide a carbon and energy source for the methylotrophic microorganisms. A gas consisting at least partially of oxygen, such as air, is bubbled through the first zone. An aqueous liquid mixture containing a mixture of various organic compounds, particularly halogenated organic compounds, is passed through the first zone where the liquid mixture becomes oxygen-enriched, then enters the second zone. As the liquid flows through the bed in the second zone, the methylotrophic and other microorganisms supported on the bed aerobically co-metabolize the organic compounds in the mixture and metabolize the methane, thereby decreasing the concentrations of the organic compounds in the mixture. In particular, such co-metabolism includes dehalogenation, such as dechlorination, of the organic compounds. The present invention may be sized to accommodate any liquid flow rates through the first and second zones from low to very high typical of industrial waste water bioponds.

As another feature of the present invention, the aqueous liquid mixture is passed through an aerobic "biopond," or waste treatment lagoon, before passing through the first and second zones. The biopond contains a suspension of various microorganisms that digest at least some of the solids suspended in the liquid mixture and reduce excess biochemical oxygen demand (BOD). Prior passage of the aqueous mixture through a biopond may minimize the risk of clogging of the bed with excessive biological growth and consequent generation of anaerobic conditions in the bed.

As another feature of the present invention, the bioreactor may be coupled to the effluent line of an industrial plant for continuously receiving and treating high volumes of wastewater from the plant as the wastewater passes through the bioreactor. The present invention is particularly suitable for treating chlorinated organics in liquid effluent from pulp and paper mills, especially bleach mills utilizing chlorine and chlorine compounds. The present invention is expected to provide effective wastewater treatment even though the concentrations of organic compounds in the effluent may vary during normal operation of the plant.

As yet another aspect of the present invention, the microbial population dispersed throughout the substrate bed is heterogeneous. The population includes plural species of methylotrophic microorganisms as well as various other microorganisms. An inoculum of such a heterogeneous microbial population can be obtained from a native population of such microorganisms occupying a depth zone between an underlying anaerobic benthal layer and an overlying aerobic layer of a pond having such layers. The term "pond" encompasses marshes, swamps, wastewater treatment lagoons and any other bodies of water having an organic-rich anaerobic benthal layer and an aerobic aqueous layer. After the inoculum is introduced into the substrate bed, the microorganisms in the inoculum will quickly colonize and proliferate throughout the bed. The microorganisms become acclimated by passing the aqueous mixture to be treated through the bed as the colonization takes place.

As another feature of the present invention, a plurality of paired first and second zones may be hydraulically coupled together in a series configuration where the liquid outlet of a previous second zone is coupled to the liquid inlet of a subsequent first zone. Optimal concentrations of oxygen and a lower-molecular-weight alkane throughout each substrate bed are maintained by separately flowing an oxygen-containing gas and the lower-molecular-weight alkane through each first and second zone, respectively. Such a series configuration may achieve higher levels of biodegradation of organic compounds in the aqueous liquid mixture than achievable using only a single stage comprised of a single first zone and a single second zone.

As another feature of the present invention, plural combinations of first and second zones may be hydraulically coupled together in a parallel configuration where the liquid inlets of all first zones are connected to a common conduit supplying aqueous liquid mixture simultaneously to the first zones and the liquid outlets of all second zones are connected to a common conduit carrying treated aqueous liquid mixture away from the bioreactor. A gas consisting at least partially of oxygen is passed through each first zone and a low-molecular-weight alkane gas is flowed through each second zone. Such a parallel configuration may permit higher volume throughput of aqueous mixture than achievable using only a single stage comprised of a single first zone and a single second zone.

A wide variety of organic compounds, particularly halogenated compounds but also including alkanes, alkenes and aromatic hydrocarbons, can be biodegraded in the biological reactor of the present invention. The term "biodegradation" includes metabolic decomposition of the organic compounds into smaller and/or simpler molecules. Biodegradation also includes dehalogenation: the removal of halogen atoms, such as chlorine atoms, from halogenated organic compounds. It is expected that the biological reactor of the present invention can be used to biodegrade various dioxin and furan compounds present in the aqueous mixture.

It is accordingly one object of the present invention to provide an improved method and apparatus for biodegrading a wide variety of organic compounds, including halogenated organic compounds, present in an aqueous mixture flowing at a high rate, such as in excess of 500,000 gallons per day.

Another object of the present invention is to provide a method and apparatus employing a heterogeneous microbial population including methylotropic microorganisms for biodegrading organic compounds, including halogenated organic compounds, at a relatively high rate.

Still another object of the present invention is to provide a method and apparatus which utilize a population of various species of microorganisms supported on substrate material with a multiplicity of passages therethrough for biodegrading organic compounds present in an aqueous mixture.

A further object of the present invention is to provide a biological reactor which may be coupled to an existing biopond which receives aqueous liquid waste from an industrial plant such as a bleach pulp mill utilizing chlorine and chlorine compounds. The biopond reduces the adsorbable organic halide (AOX) of the aqueous mixture as the mixture passes through the biopond and total organic carbon (TOC) before the mixture enters the biological reactor of the present invention.

Another object of the present invention is to provide a method and apparatus for continuously treating effluent from an industrial plant.

Still another object of the present invention is to provide a biological reactor which is cost-effective to manufacture, install, maintain and use, and also which may have a self-cleaning bed.

These and other objects, features and advantages of the present invention will become apparent with reference to the following description and drawings.

DETAILED DESCRIPTION OF THE ILLUSTRATED EMBODIMENTS

The present invention is concerned with a method and apparatus for the aerobic biodegradation of organic compounds, particularly halogenated organic compounds, found in an aqueous mixture to effectively remove these contaminating compounds from the mixture. Aqueous mixtures with which the invention is concerned may include natural surface waters, drinking water, ground water, leachates from landfills, industrial wastewaters, and waters such as those produced by an interdiction well designed to intercept and remove a plume of contaminating ground water. The present invention is particularly applicable to the treatment of industrial wastewaters containing chlorinated organic compounds as they are generated by an industrial plant, such as in large volumes from a bleach pulp or paper mill utilizing chlorine or chlorine compounds. Broadly, however, the invention is concerned with the treatment of water to remove various organic contaminants, regardless of the source or location of the water.

Figure 1:
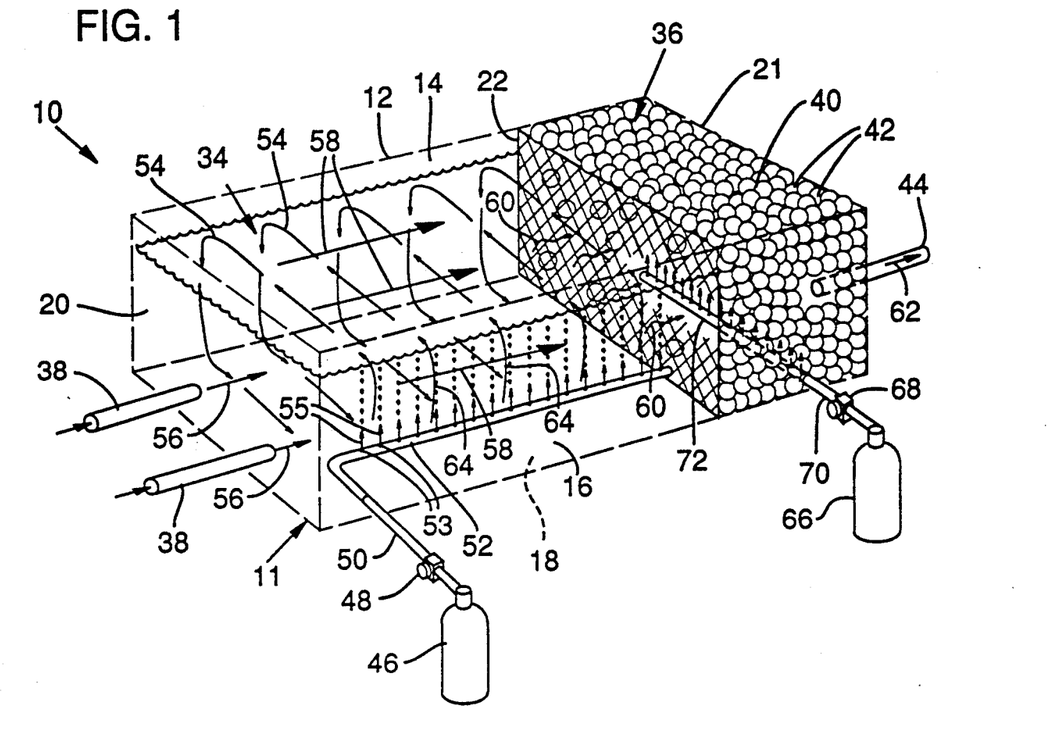
FIG. 1 is an isometric view of one form of biological reactor in accordance with the present invention, comprising a single oxygen-enriched first zone coupled to a single second zone, the second zone containing a bed supporting a heterogeneous microbial population, including methanotrophic microorganisms.

With reference to FIG. 1, one form of biological reactor 10 in accordance with the present invention includes a hollow housing 11 comprised of a first side wall 14, an opposing side wall 16, a bottom plate 18, and first and second opposed end walls 20, 21. A screen 22 separates the interior of housing 11 into first and second sections or zones 34, 36. These zones are thus contiguous, sharing and being separated from each other via the screen 22.

The side walls, end walls, and bottom plate of the housing 11, including the screen 22, may be made of any suitable corrosion-resistant material, such as plastic or stainless steel. The screen 22 permits virtually unobstructed liquid flow from the first zone 34 to the second zone 36. Although the housings 34 and 36 are shown and described herein as having a substantially rectangular shape, other shapes are also suitable. In addition, the housing and wall 20 may be open and wall 21 replaced by a screen in the event the housing is submerged in an outlet flow region of a lagoon or biopond. Also, the housing walls and bottom may be formed by side and bottom regions of a biopond with netting to define the second zone 36. Other liquid permeable retaining means may of course be used instead of screen, but in high volume applications the retaining means must permit high rates of liquid flow therethrough.

Figures 4A, 4B:
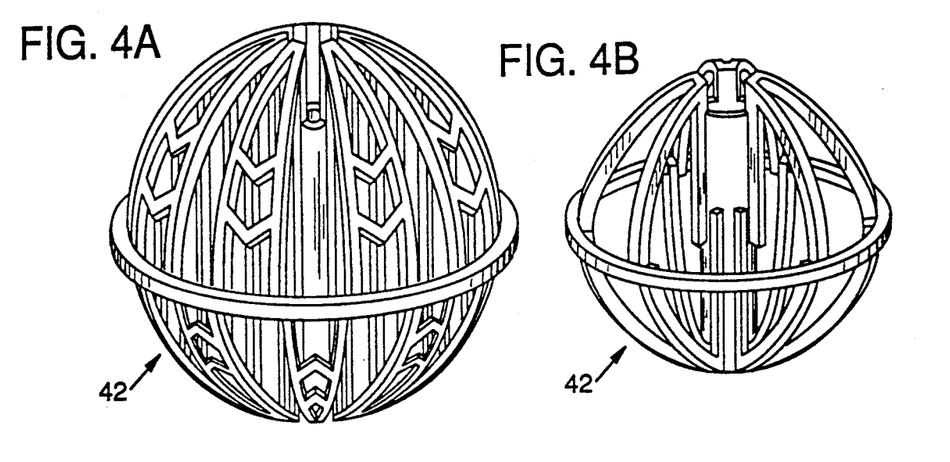
FIGS. 4A and 4B illustrate two types of bacteria supporting substrate pieces, a plurality of the substrate pieces being packed into the volume defined by the housing of the second zone.

The first zone 34 contains no supporting bed for microorganisms. Instead, the housing 12 is kept filled with the aqueous liquid mixture as the liquid passes through the first to the second zone. One or more liquid inlets 38 through end well 20 may be used to deliver liquid to be treated to the first housing zone 34. The second zone 36 contains a substrate bed 40. The bed 40 is of any material capable of supporting a heterogeneous population of methylotrophic and various other microorganisms and which permits the desired flow rate through the bed for the particular application. For minimal pressure drop and maximal surface area of microorganisms, the substrate bed 40 may be comprised of a multiplicity of spherical objects 42 (FIGS. 4A, 4B), each of which has a high surface-area-to-open-volume and multiple large passages therethrough. The passages are defined by plural ribs, fins, conduits and other structural elements skeletally comprising each spherical object. The structural elements also increase the surface area of each spherical object for colonization by the microorganisms. The spherical objects 42 may be made of any suitable material which will support films and colonies of microorganisms growing on exterior and interior surfaces thereof. Preferably, the spherical objects 42 are molded of a rigid plastic such as polypropylene or polyethylene. Other substances, such as glassy, ceramic, or calcined inorganic material may also be used, including such materials formed into irregular shapes or configurations. In large-volume liquid treatment applications, the bed 40 is comprised of materials with a high surface-area-to-volume ratio and which allows liquid to flow therethrough at high flow rates with minimal pressure drop. In the embodiment of FIG. 4A, each molded sphere 42 is approximately 4 inches in diameter and is formed with a number of regularly spaced longitudinal ribs converging on each pole of the sphere, an equatorial rib and numerous interior ribs and fins parallel to the axis of the sphere. Each such sphere has a high specific surface area, while still permitting virtually unobstructed liquid flow through each sphere. Liquid is maintained in the bed 40 at a depth that keeps the spheres 42 submerged to provide a suitable aqueous environment for the microorganisms growing thereon. The spheres of FIG. 4B are typically smaller, for example one and one-eighth inch in diameter, but have similar characteristics. These spheres or similar objects are commercially available and have been used in industrial stripping applications.

The illustrated end wall 21 of the housing 11 includes a liquid outlet 44. Hence, a stream of aqueous liquid mixture entering the first zone 34 through a liquid inlet 38 is directed across the first zone 34, through the screen 22, through the second zone 36, and then exits from the bioreactor through the liquid outlet 44. The screen 22, in addition to allowing substantially unobstructed liquid flow between the first zone 34 and second zone 36, also prevents the bed forming objects 42 from spilling into the first zone 34. The bioreactor 10 of the present invention does not require a cover over the first zone 34 or second zone 36, but a cover may be used, if desired.

The methylotrophic microorganisms comprising a portion of the heterogeneous microbial population colonized throughout the bed 40 dehalogenate and further biodegrade organic compounds from an aqueous mixture passing therethrough which is contaminated with such compounds. The mixed microbial population includes methylotrophic and methanotrophic microorganisms, the latter being a subclass of methylotrophs. The biological reactor of the present invention functions optimally under conditions favoring a microbial population throughout the bed enriched with methanotrophs. However, a microbial population predominantly methylotrophic will also serve well. In either case, both methylotrophic and methanotrophic species seem to be present in bed inocula (see below) and will proliferate throughout the bed.

Methylotrophs as a general group are physiologically distinctive, capable of utilizing methane and other lower-molecular-weight alkanes, in particular those containing one to four carbon atoms, as sole sources of carbon and energy. These organisms are widely distributed in aquatic or moist environments and are taxonomically diverse, including certain bacteria and possibly other types of microorganisms. All known methylotrophic bacteria are gram negative, facultative aerobes and exist in a variety of shapes.

Methanotrophic microorganisms are obligate in their use of methane, being able to use as a carbon and energy source only compounds containing no C-C bonds. They are indigenous to soil and to aquatic environments having sufficient methane and oxygen concentrations for their growth. Natural aquatic environments where such microorganisms are found include swamps, cattail marshes, lakes and ponds. In these environments, methane is produced from anaerobic decomposition of dead plant and animal matter and various other organic compounds, particularly by methanogenic microorganisms. The methanotrophic microorganisms are usually present as a heterogeneous population in a given environment, where the species profile, which includes methanotrophs, other methylotrophs, and various heterotrophic microorganisms, is determined by the prevailing types and levels or organic compounds, other nutrients, and gases. Such a mixed culture tends to be somewhat symbiotic, where each type of microorganism utilizes one or more metabolic by-products of another type of microorganism.

Methanotrophic microorganisms also oxidize other organic compounds via a process termed "co-metabolism." Co-metabolism is the transformation of a non-growth compound in the obligate presence of a growth compound or another transformable compound. Dalton and Stirling, *Phil. Trans. R. Soc. Lond.* B297:481 (1982). Co-metabolism by methanotrophs is catalyzed by the methane monooxygenase (MMO) enzyme system. MMO catabolism of methane proceeds via a four-step enzymatic pathway by which methane is oxidized in the presence of oxygen to carbon dioxide, with methanol being a principal intermediate. MMO is non-specific as to enzyme substrate, gratuitously oxidizing, in the presence of methane and oxygen, a wide variety of other organic compounds, including alkanes, alkenes, ethers and aromatics, even though the methanotrophic microorganisms cannot utilize the metabolic products. MMO also oxidizes recalcitrant chlorinated organic compounds, rendering them more susceptible to biodegradation by other heterotrophic microorganisms. One possible mechanism for MMO oxidation of chlorinated organics is the conversion to an epoxide, liberating inorganic chloride. The epoxide is then rearranged or hydrolyzed to produce compounds for heterotrophs.

Generally, an increase over a defined range in the concentration of methane and oxygen in a microbial environment leads to an increase in methane metabolism by methanotrophs and a fortuitous increase in the oxidation of other organic compounds. During conditions of elevated methane concentration, as the methanotrophic microorganisms produce increased amounts of various oxidized compounds from MMO co-metabolism, the population of other methylotrophic and various heterotrophic microorganisms also increases, deriving carbon and energy from compounds partially oxidized by the methanotrophs. Such cooperative dehalogenation and biodegradation by a mixed microbial population is termed "biotransformation."

Methylotrophs can utilize various lower-molecular weight alkanes, particularly saturated $C_1$ to $C_4$ compounds, as sources of carbon and energy. Methylotrophs, like methanotrophs, co-metabolize other organic compounds via enzymatic processes involving MMO and protably other enzyme systems. As with methanotrophs, ar increase over a defined range in the concentrations of oxygen and a carbon and energy source, such as $C_1$–$C_4$ alkanes, methanol, etc., leads to an increase in the fortuitous oxidation of other organic compounds, including halogenated organic compounds.

One environment where various methylotrophic (including methanotrophic) microorganisms have been found in large numbers is in the intermediate layer between an underlying benthal layer and the overlying aerobic layer in a marsh or pond having such layers. Such layers, including the methylotroph-rich intermediate layer, are also found in aerobic bioponds used for treatment of effluent from industrial plants, such as pulp and paper mills, including such mills utilizing chlorine and chlorine compounds. The particular species profile of methylotrophic microorganisms obtained from any of the environments where such microorganisms are found is a result of a dietary preselection process, where those organisms growing particularly well on the compounds present in the particular environment will be favored and represent the largest proportions of microorganisms found therein.

A heterogeneous population of microorganisms, including methylotrophs, methanotrophs, and associated heterotrophs obtained as an inoculum from a native environment is capable of adhering to and proliferating on a supportive substrate if oxygen and the appropriate source of carbon and energy are provided. Thus, these microorganisms are capable of colonizing the bed 40 in the present invention. Inocula of such a mixed microbial population can be obtained either from a natural source such as pond or marsh, or from an aerobic waste treatment lagoon or "biopond." Each inoculum will have a particular distribution of microbial species, depending upon the concentrations of oxygen and upon the types and concentrations of other organic compounds, inorganic nutrients, as well as temperature and the pH of the source. In fact, an inoculum having a species profile "tailored" for a particular mixture of organic compounds to be biodegraded can be obtained by procuring the inoculum from an aerobic biopond exposed to the same or similar waste material as that to be biodegraded by the microorganisms on the substrate bed. By increasing the concentrations of oxygen and whatever low-molecular-weight alkane is used as a carbon and energy source flowing through a substrate bed of the present invention colonized by such an inoculum, it is possible to significantly enhance the rate at which the microorganisms biodegrade the organic compounds.

In the illustrated FIG. 1 embodiment, the oxygen-containing gas is supplied to the first zone from a source of air or oxygen 46. Although oxygen gas is preferred, air will result in satisfactory performance of the bioreactor. Oxygen-containing gas from source 46 flows through a flow control valve 48 and a conduit 50. The conduit 50 passes through the side wall 16 into the first zone 34 and is connected to a horizontal conduit 52 which extends along the length of housing 12 near the lower horizontal edge of the side wall 16. The conduit 52 has a plurality of apertures 53 linearly arranged along the length of the top surface thereof. The apertures 53 permit the oxygen-containing gas flowing through the conduit 52 to bubble into the liquid occupying the first zone 34, as indicated by a plurality of arrows 55. Because the conduit 52 is situated adjacent to the side wall 16, rather than centered along the longitudinal axis of zone 34, the oxygen-containing gas injected into the liquid in the first zone 34 will cause the liquid to move in a transverse circulatory current, as indicated by the arrows 54. This type of circulation pattern enhances rapid absorption of oxygen into the liquid passing through the first zone 34, maintenance of an aerobic condition throughout the first zone 34, and the continual suspension of any solids. Plural conduits 52 and other oxygen dispersion means, such as apertured baffles and other mechanisms may also be used. Typically an excess of oxygen, over that which can be dissolved in the liquid, is flowed into zone 34. This oxygen enriched liquid then flows into the second zone 36.

The aqueous liquid mixture from an upstream source enters the first zone 34 through liquid inlets 38 on the end wall 20, as indicated by the arrows 56. Consequently, there is a net flow of liquid in a horizontal direction from end wall 20, through the first zone 34 as indicated by arrows 58, through the screen 22, through the substrate bed 40 in the second zone 36 as indicated by arrows 60, and exiting the second zone 36 through liquid outlet 44 in the end wall 32, as indicated by arrow 62. The combination of the hydraulic flow through the first zone, as indicated by arrows 58, and the transverse circulatory pattern in zone 34, as indicated by the arrows 54, results in an approximately spiral flow pattern through first zone 34, as indicated by the arrows 64.

A gas consisting substantially of a lower-molecular-weight alkane, in particular a saturated $C_1$–$C_4$ alkane is supplied to the second zone 36 from a source 66. The alkane gas may be natural gas; American natural gas usually consists of approximately 85% methane, 9% ethane, 3% propane, and 1% butane. However, the gas can also be supplied from a compressed gas source as indicated in FIG. 1. Alternatively, an anaerobic biological reactor may be used as a source of methane, as described below and in connection with FIG. 5. The alkane gas from source 66 flows through a flow control valve 68, a conduit section 70 which passes through the side wall 16 into the second zone 36, and a horizontal conduit 72 extending horizontally and transversely across the second zone 36 just above the interior surface of bottom plate 18. The horizontal conduit 72 defines a plurality of apertures 74 arranged linearly along the top surface of conduit 72. Plural conduits 72 and other methane gas dispersion means, such as apertured baffles and other mechanisms may also be used. The alkane gas passing through the apertures 74 enters the substrate bed 40 as indicated by arrows 76.

The source of the aqueous liquid mixture entering the bioreactor 10 through the liquid inlets 38 may originate from any source of contaminated aqueous liquid such as drinking water, ground water, industrial wastewater, leachates from landfills, contaminated liquids in drums, and so forth. For purposes of discussion, and without limiting the scope of the invention, the following description assumes that the source of the aqueous mixture is a wastewater effluent line of an industrial plant, such as a pulp or paper mill, especially a bleach mill using chlorine or chlorine compounds. The flow rates from such a plant can be 500,000 to 1,000,000 gallons per day or higher. Large paper mills can produce up to 50,000,000 gallons of wastewater per day.

The liquid effluent from such bleach pulp and paper mills includes a wide range of chlorinated organic compounds, formed chiefly from the chemical reactions of the chlorine bleaching agents on lignins and extractable compounds from wood. These chlorinated organic compounds include chlorinated alkanes and alkenes, as well as various chlorinated and polychlorinated aromatic compounds. Dioxin homologs are also present in parts-per-trillion concentrations in the effluent of some bleach pulp and paper mills. Similarly, industrial plants, using other strongly reactive halogen-containing compounds, such as brominating agents, in the presence of various organic substances may produce wastewater containing other halogenated organic compounds. The biological reactor of the present invention would be capable of dehalogenating and further biodegrading at least a portion of the organic compounds present in such wastewaters. That is, the biological reactor of the present invention would be capable of (a) dehalogenating at least a portion of the halogenated organic molecules present in such aqueous mixtures, where dehalogenation includes dechlorination, (b) dechlorination and further biodegradation of at least a portion of the polychlorinated aromatic compounds present in such aqueous mixtures, and (c) biodegrading at least a portion of the dioxin compounds present in such aqueous mixtures.

The first zone 34 and second zone 36, respectively, may be sized sufficiently large to treat the entire effluent from a wastewater effluent line of the mill. As a specific example, one biological reactor of the type shown in FIG. 1 has been designed with a transverse width dimension of 10 feet, a height of 8 feet, a first zone length of 10 feet, and a second zone length of 5 feet. This specific reactor is expected to substantially reduce the concentration of organic compounds in the wastewater. To increase the capacity of a system employing these reactors, plural of such reactors may be operated in parallel or series configurations.

Initial acclimation of a microbial inoculum on the bed 40 can be accomplished by passing air or oxygen into first zone 34 and a lower-molecular-weight alkane gas such as methane or natural gas into second zone 36, while recycling wastewater through the first and second zones during the acclimation period. The acclimation process selects for a species profile of microorganisms on the bed 40 which is best able to thrive in the wastewater being treated.

Typically, an excess amount of alkane gas and air or oxygen would be provided to optimize co-metabolism of the organic compounds in the aqueous mixture by the microorganisms. Consequently, excess alkane gas, air or oxygen, and any other gases generated during the biodegradation process are given off by the reactor. After setting up a biological reactor according to the present invention near a source of contaminated water, the ratios of alkane gas to air or oxygen may be readily adjusted as required to enhance the biodegradation of the specific organic contaminants in the water, to maximally reduce the level of organic contaminants in the water, and to minimize the amount of residual gases given off by the reactor.

Figure 2:
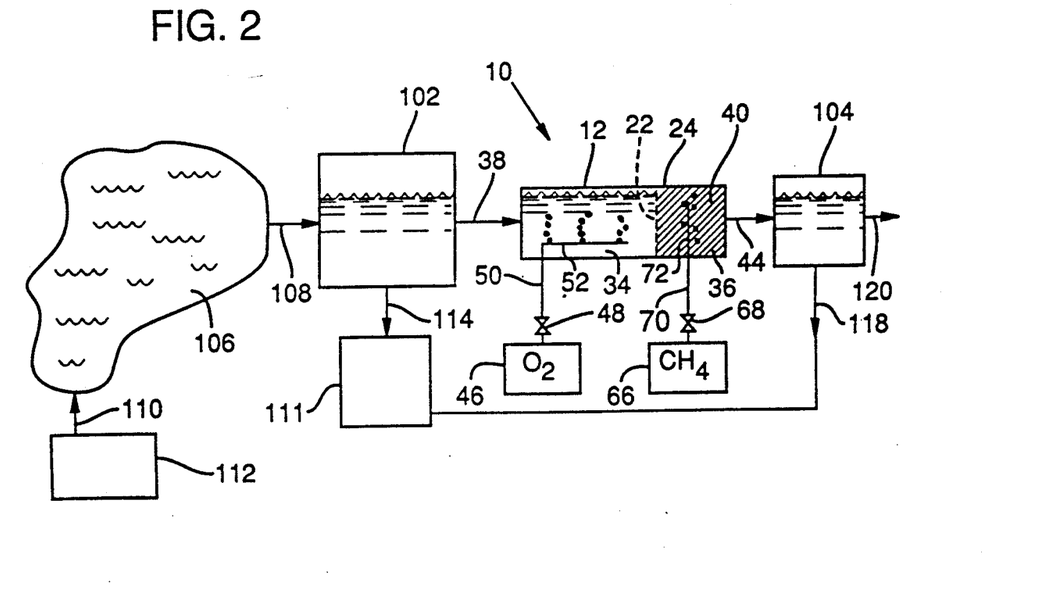
FIG. 2 is a schematic block diagram of the biological reactor of FIG. 1 shown hydraulically coupled to settling basins both before the first zone and after the second zone, and with an aerobic biopond upstream of the first settling basin.

FIG. 2 is a schematic block diagram of a bioreactor 10 according to the present invention hydraulically coupled to a settling basin 102 situated upstream of the bioreactor 10 and connected to the bioreactor 10 such as via a conduit 38. The bioreactor 10 may also be hydraulically coupled, such as via a conduit 44, to a downstream settling basin 104. The upstream settling basin 102 receives outflow from an aerobic biopond 106, the biopond outflow entering the upstream settling basin 102 through a conduit 108. The aerobic biopond 106 receives effluent, such as through a conduit 110, from an industrial plant such as a bleach pulp or paper mill 112. The upstream settling basin 102 removes substantially all solid material from the aqueous liquid mixture, such solid material being removed as required from the settling basin 102 through a conduit 114 to a conventional solids drying mechanism 111. The downstream settling basin 104 further removes solid material that might have been generated by passage of the aqueous liquid mixture through bioreactor 10. Any solids collecting in the downstream settling basin 104 can be removed as required through a conduit 118 to the solids drying mechanism 116. Treated aqueous liquid exits the downstream settling basin 104 through a conduit 120.

As shown in FIG. 2, the bioreactor 10 is comprised of a housing 11 with at least of a single first oxygen-enriched zone 34 and a single second zone 36 containing the bed 40 of microorganisms. The illustrated first zone 34 is separated from the second zone 36 by a screen 22, shown by a dashed line. The first zone 34 is supplied with oxygen from source of oxygen-containing gas 46 through a valve 48 and a conduit 50 to a conduit 52 from which the oxygen-containing gas flows upward into the liquid contained in the first zone as previously discussed. The second zone 36 is supplied with lower-molecular-weight alkane gas from source 66 through valve 68 and conduit 70 and conduit 72, from which the gas flows upward through the substrate bed 40, as discussed above in connection with FIG. 1. The use of an aerobic biopond 106, an upstream settling basin 102, and a downstream settling basin 104 as shown in FIG. 2 are optional, depending upon the concentration of organic compounds in the waste stream and/or the biochemical oxygen demand of that waste stream. Waste streams having low biochemical oxygen demand may require no aerobic biopond or settling basins, in which case the bioreactor 10 of the present invention can be hydraulically coupled directly to the effluent line 110 of the industrial plant 112.

Figure 3:
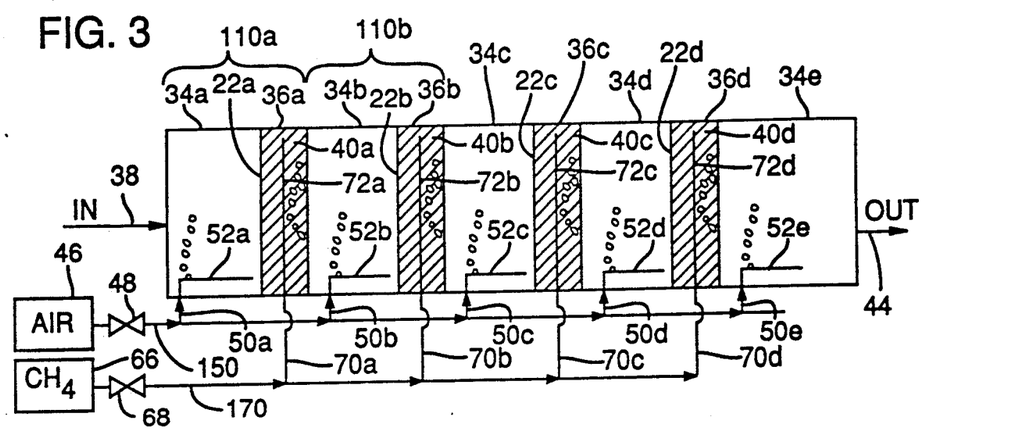
FIG. 3 is a schematic side elevational view of another form of biological reactor in accordance with the present invention, comprised of a plurality of combinations of the first and second zones hydraulically coupled in a series configuration.

FIG. 3 shows a bioreactor according to the present invention that is comprised of a plurality of series-connected pairs of first and second zones. For example, a first pair 110a is comprised of a first zone 34a and a second zone 36a. A second pair 110b is comprised of a first zone 34b and a second zone 36b. Subsequent zones are configured likewise. The sizes of each first and second zone can be different from each other, depending upon liquid flow rate, composition and concentration of the wastewater, desired degree of biodegradation, and other parameters. The liquid inlet 38 is coupled to the first zone 34a of pair 110a. Liquid enters the first zone 34a of the first pair 110a through liquid inlet 38. The liquid then passes through the first zone 34a, through a screen 22a and through the second zone 36a. From zone 36a, the partially treated liquid passes through a second screen 23a and enters the first zone 34b of the second pair 110b, and so on through each pair of first and second zones. Oxygen-containing gas is supplied to the first zone of each pair from a source 46, through a valve 48, and a trunk conduit 150 which supplies the gas through branch conduits 50a, 50b, 50c, 50d and 50e. Each branch conduit is coupled to a corresponding perforated conduit 52a, 52b, 52c, 52d and 52e, respectively. Lower-molecular-weight alkane gas is supplied to the second zone of each pair from a source 66, through a valve 68, and a trunk conduit 170, which supplies the gas to each branch conduit 70a, 70b, 70c and 70d. Each branch conduit supplies the alkane gas to a corresponding perforated conduit 72a, 72b, 72c and 72d. The perforated conduits for the oxygen-containing gas 52a-e are situated in the corresponding first zone as shown in FIG. 2. Likewise, each perforated conduit for the alkane gas extends across the transverse width of the substrate bed in the corresponding second zone as shown in FIG. 2. The final aeration first zone 12e is optional, and may be useful for further reduction of the biochemical oxygen demand of the aqueous liquid mixture before the mixture enters the liquid outlet 44. Outlet 44 may be hydraulically coupled to a downstream settling basin 104 as shown in FIG. 1.

The series configuration of multiple pairs of first and second zones as shown in FIG. 3 is particularly useful for achieving a higher degree of biodegradation of the organic compounds present in the aqueous liquid mixture than achievable using only a single paired first and second zone. Multiple pairs of first and second zones may also be useful for treating liquid waste effluent from industrial plants producing such effluent at extremely high flow rates or high concentrations of contaminant organic compounds. It is also possible to hydraulically couple a plurality of pairs of first and second zones to a waste effluent line in a parallel configuration, which may be particularly useful for treating extremely high flow rates of liquid waste.

Figure 5:
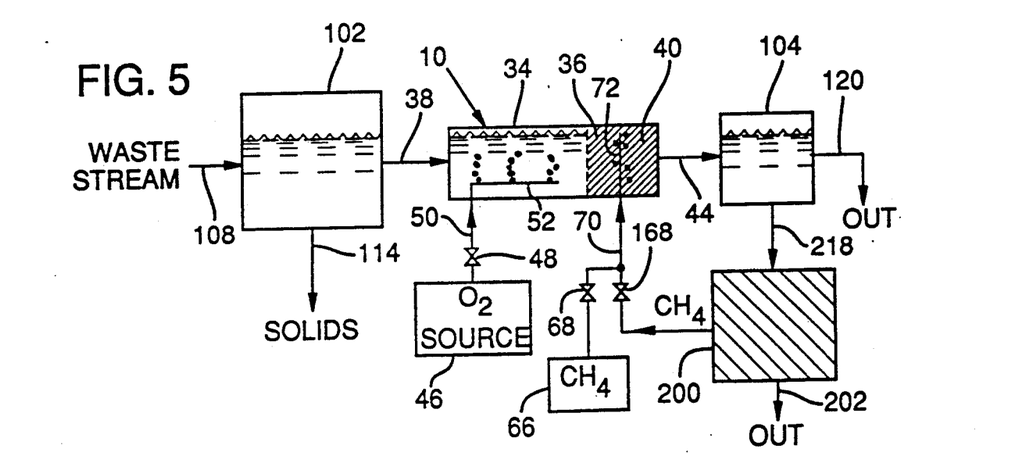
FIG. 5 is a schematic block diagram of a biological reactor comprised of a single first zone and a single second zone in accordance with the present invention with an upstream settling basin and a downstream settling basin, the stream of waste liquid passing through the first settling basin and which includes a second bioreactor containing methanogenic microorganisms for generating and supplying at least a portion of the methane gas used by the second zone.

In FIG. 5, in addition to the primary biological reactor 10, a secondary biological reactor 200 containing a bed of methanogenic microorganisms is provided for the purpose of supplying, as methane, at least a portion of the lower-molecular-weight alkane gas requirement of the primary biological reactor 10. The primary biological reactor 10 includes a first zone 34 and a second zone 36, the second zone containing a bed 40 of methylotrophic and other aerobic microorganisms. A stream of aqueous liquid containing organic compounds enters the first zone through conduit 38 from an upstream settling basin 102 or, alternatively, from an aerobic biopond (not shown), or directly from an industrial plant (not shown). Oxygen, in the form of air or a gas consisting substantially of oxygen, is supplied from a source 46 through valve 48 and conduit 50 and conduit 52 to the first zone 34 as described previously. Methane is supplied to the second zone 36 from the secondary reactor 200, which contains a bed of methanogenic microorganisms. The secondary reactor 200 does not receive air, oxygen or alkane gas.

Methanogenic microorganisms, such as those in the secondary reactor 200, are typically found in anaerobic benthal sediments of natural aquatic environments and man-made waste treatment lagoons. Methanogens produce methane and carbon dioxide via biodegradation of dead biomass and other organic substances. The methane rises to higher sedimentary layers populated by methanotrophs and other methylotrophs which metabolize the methane. Although the methanogenic microorganisms in the secondary reactor 200 may be supplied with any suitable supply of carbon and energy, it is particularly advantageous to use a portion of the treated water exiting the second zone 36 of the bioreactor 10 as such a source. Because the co-metabolic biological processes occurring in the primary reactor 10 are particularly useful for dehalogenation, the effluent from the primary biological reactor 10 may still contain substantial amounts of dehalogenated organic compounds, particularly if the transit time of the aqueous liquid through the primary biological reactor 10 is kept short. Such dehalogenated compounds may be ideal sources of carbon and energy for the methanogenic microorganisms in the secondary reactor 200.

In FIG. 5, a portion of the treated water from the post-settling basin 104 is passed through a conduit 218 to the secondary reactor 200. Methane gas generated by the methanogenic bacteria is flowed through a valve 168 and a conduit 70 directly into the bed 40 of microorganisms in the second zone 36. The secondary reactor 200 may be sized sufficiently to provide all of the methane required by the microorganisms in bed 40. Alternatively, a back-up methane source 66, such as a natural gas pipeline, may be coupled through a valve 68 to the conduit 70 to supply methane to the bed 40 in the event that the secondary reactor 200 produces an insufficient supply or is removed from service. If conditions permit, the liquid supplying the carbon and energy needs of the methanogenic bacteria in the secondary reactor 200 may also be supplied directly from the liquid outlet 44 of second zone 36 rather than from a downstream settling basin 104. Liquid effluent from the secondary reactor 200 passes through a liquid outlet 202.

With reference to FIG. 5, a pretreatment or upstream settling basin 102 or biopond may be used in conjunction with the bioreactor 10 of the present invention. Typically, the upstream settling basin 102 receives industrial plant wastewater effluent, or contaminated water from some other source, before the wastewater is routed to the bioreactor 10. The upstream settling basin 102 removes both solids and a portion of the organic carbon from the contaminated water before the water enters the biological reactor 10. Removing these substances from the water substantially reduces the risk of clogging the biological reactor 10 with biomass.

If required, it is also possible to continuously remove a portion of the benthic material from the upstream settling basin 102 or biopond for addition to the liquid stream flowing through conduit 218 upstream of the secondary reactor 200 (details not shown in FIG. 5). Since methanogens normally inhabit benthic sediments where the organisms facilitate decomposition of dead biomass, it may be necessary to ensure optimal methane production, to fortify the liquid flowing through the bed of methanogens in the secondary reactor 200 with such benthic material before passing through the secondary reactor 200. Such fortification may be particularly important if the primary bioreactor 10 has been especially effective in removing total organic carbon from the liquid passing therethrough.

It is also possible to couple the secondary reactor 200 upstream of the primary reactor 10, thereby supplying the methanogenic microorganisms in the secondary reactor with a higher concentration of carbonaceous compounds for greater methane production. Such an arrangement would not be practical, however, if the raw wastewater stream contained a toxic level of halogenated organic compounds that needed to be lowered via passage through the primary reactor before passage through the secondary reactor.

Having illustrated and described the the principles of our invention with reference to several preferred embodiments, it should be apparent to those of ordinary skill in the art that such embodiments may be modified in detail without departing from such principles. We claim as our invention all such modifications as come within the true spirit and scope of the following claims.

We claim:

1. A method for dehalogenating and further biodegrading organic compounds present in an aqueous mixture to at least partially remove the organic compounds from the liquid, the method comprising:

flowing the aqueous mixture through a first liquid zone;

flowing a first gas through the first zone, the first gas including oxygen so as to enrich the concentration of oxygen in the aqueous mixture as it flows through the first liquid zone;

supporting a mixed microbial population of microorganisms including methylotrophs on a substrate bed in a second zone;

flowing a second gas through the bed, the second gas consisting primarily of a low-molecular-weight alkane so as to, provide a carbon and energy source for the microorganisms on the bed;

flowing the oxygen-enriched aqueous mixture from the first zone through the bed of the second zone such that the microorganisms dehalogenate and metabolize the organic compounds in the aqueous mixture flowing through the bed.

2. A method according to claim 1 including the step of flowing the aqueous mixture in succession through a plurality of treatment regions, each such region comprising an oxygen-enriched liquid first zone followed by a second zone having a bed containing a mixed microbial population of methylotrophic microorganisms, flowing the second gas into each bed of methylotrophic microorganisms, and flowing the first gas into each oxygen-enriched first zone.

3. A method according to claim 2 in which the net flow of the aqueous mixture through each of the first zones is in a first direction and the net flow of the first gas through each of the first zones is in a direction substantially perpendicular to the first direction.

4. A method according to claim 3 in which the first direction is horizontal.

5. A method according to claim 2 in which the aqueous mixture comprises liquid waste effluent from a mill of the group including pulp and paper mills, the liquid waste effluent being generated at a flow rate averaging over 500,000 gallons each day that the mill is operating and in which the flowing of the aqueous mixture from the first zone and through the bed of the second zone comprises flowing substantially all of the liquid waste effluent through at least one combination of a first zone and a second zone.

6. A method according to claim 5 including the step of flowing substantially all of the liquid waste effluent into an aerobic biopond and from the biopond through the plurality of treatment regions.

7. A method according to claim 1 including the step of flowing the aqueous mixture into an aerobic biopond and flowing the aqueous mixture from the biopond to the first zone.

8. A method according to claim 7 including the step of flowing the aqueous mixture from the aerobic biopond into a solids removal zone;

removing solids from the aqueous mixture in the solids removal zone; and flowing the aqueous mixture from the solids removal zone to the first zone.

9. A method according to claim 8 including the step of flowing the aqueous mixture from the second zone to a second solids removal zone and the step of removing solids from the aqueous mixture in the second solids removal zone.

10. A method according to claim 7 including the step of flowing the aqueous mixture in succession through a plurality of treatment regions, each such region comprising an oxygen-enriched liquid first zone followed by a second zone having a bed containing a mixed microbial population of methylotrophic microorganisms, flowing the second gas into each bed of microorganisms, and flowing the first gas into each oxygen-enriched first zone.

11. A method according to claim 10 including the step of flowing the aqueous mixture from the biopond into a solids removal zone;

removing solids from the aqueous mixture in the solids removal zone; and flowing the aqueous mixture from the solids removal zone to the first zone of the first treatment region.

12. A method according to claim 11 including the step of flowing the aqueous mixture from the second zone to a second solids removal zone and the step of removing solids from the aqueous mixture in the second solids removal zone.

13. The method of claim 7 including the preliminary steps of obtaining an inoculum of methylotropic and heterotropic microorganisms from the biopond, the biopond having a native population of such organisms occupying a depth zone between an underlying anaerobic benthal layer and an overlying aerobic layer, introducing the inoculum into the bed, and colonizing the bed with the inoculum.

14. A method according to claim 7 in which the aqueous mixture comprises liquid waste effluent from a mill of the group including pulp and paper mills, the liquid waste effluent being generated at a flow rate averaging over 500,000 gallons each day that the mill is operating, the method including the step of flowing substantially all of the liquid waste effluent into the biopond and in which the step of flowing the aqueous mixture from the first zone and through the bed of the second zone comprises flowing substantially all of the liquid waste effluent from the biopond through the first zone and the second zone.

15. A method according to claim 1 in which the net flow of the aqueous mixture through the substrate bed is in a first direction and the net flow of the second gas through the substrate bed is in a direction substantially perpendicular to the first direction.

16. A method according to claim 15 in which the first direction is horizontal.

17. A method according to claim 1 including the step of supplying at least a portion of the second gas from a bioreactor containing methanogenic microorganisms.

18. A method according to claim 1 including the step of supplying the second gas from a source of natural gas.

19. A method according to claim 1 in which the aqueous mixture includes at least one halogenated organic compound and in which the biodegradation includes dehalogenation of at least a portion of the halogenated organic molecules in the aqueous mixture.

20. A method according to claim 19 in which the aqueous mixture includes at least one chlorinated organic compound and in which the biodegradation includes dechlorination of at least a portion of the chlorinated organic compound in the aqueous mixture.

21. A method according to claim 20 in which the aqueous mixture includes at least one polychlorinated aromatic compound and in which the biodegradation includes dechlorination of at least a portion of the polychlorinated aromatic compound.

22. A method according to claim 1 wherein the organic compounds in the aqueous mixture include dioxin and at least one other organic compound and wherein dehalogenation of such one other organic compound is performed in the presence of the dioxin and there is a decrease in the concentration of dioxin in the aqueous liquid mixture as it passes through the bed.

23. The method of claim 1 including the preliminary steps of obtaining an inoculum of methylotrophic and heterotrophic microorganisms from a native population of such organisms occupying a depth zone between an underlying anaerobic benthal layer and an overlying aerobic layer of a pond having such layers, introducing the inoculum into the bed, and colonizing the bed with the inoculum.

24. The method of claim 1 wherein the organic compounds include soluble adsorbable organic halide and wherein there is a substantial decrease in the concentration of soluble adsorbable organic halide in the aqueous liquid mixture as it passes through the bed.

25. A method according to claim 1 in which the aqueous mixture comprises liquid waste effluent from a mill of the group including pulp and paper mills, the liquid waste effluent being generated at a flow rate averaging over 500,000 gallons each day that the mill is operating and in which the flowing of the aqueous mixture from the first zone and through the bed of the second zone comprises flowing substantially all of the liquid waste effluent through the first zone and the second zone.

26. A method according to claim 1 wherein the organic compounds in the mixture include furan and at least one other organic compound and wherein dehalogenation of such one other organic compound is performed in the presence of furan and there is a decrease in the concentration of furan in the aqueous liquid mixture as it passes through the bed.

* * * * *